(12) United States Patent
Xu et al.

(10) Patent No.: US 9,008,813 B2
(45) Date of Patent: Apr. 14, 2015

(54) METHOD TO IMPROVE THE DIMENSIONAL ACCURACY AND SURFACE QUALITY FOR LARGE SPRING BACK COMPENSATION FOR FUEL CELL BIPOLAR PLATE FORMING

(75) Inventors: Siguang Xu, Rochester Hills, MI (US);
Paul A. LeBlanc, Macomb, MI (US);
Steven J. Spencer, Rochester, NY (US);
Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 722 days.

(21) Appl. No.: 13/240,153

(22) Filed: Sep. 22, 2011

(65) Prior Publication Data

US 2013/0074318 A1 Mar. 28, 2013

(51) Int. Cl.
| | |
|---|---|
| *G06F 19/00* | (2011.01) |
| *G06F 17/50* | (2006.01) |
| *B23P 17/04* | (2006.01) |
| *B23Q 17/00* | (2006.01) |
| *G06T 15/00* | (2011.01) |
| *G06T 17/00* | (2006.01) |
| *H01M 8/02* | (2006.01) |

(52) U.S. Cl.
CPC .............. *H01M 8/0206* (2013.01); *Y02E 60/50* (2013.01)

(58) Field of Classification Search
CPC ....... B21D 51/24; A61F 2/3094; Y02E 60/50; Y02E 60/521; H01M 8/0258; H01M 8/0247; H01M 2008/1095; H01M 8/0232; H01M 8/02; G06F 17/50; G05B 19/41885; G05B 19/4097; G05B 19/4099; G05B 19/408; G05B 19/4093; G05B 19/40937; G06T 17/00

USPC ................... 29/404, 592; 429/457, 518, 535; 700/159, 180, 182, 96–98; 345/419, 345/420; 703/1; 427/115
See application file for complete search history.

(56) References Cited

U.S. PATENT DOCUMENTS

| | | | | |
|---|---|---|---|---|
| 4,609,595 | A | * | 9/1986 | Nickols .......................... 429/464 |
| 5,552,992 | A | * | 9/1996 | Hunter .......................... 700/118 |
| 6,073,056 | A | * | 6/2000 | Gawronski et al. ............. 700/98 |
| 6,256,546 | B1 | * | 7/2001 | Graham et al. .................. 700/30 |
| 6,745,101 | B2 | * | 6/2004 | Andersen et al. .............. 700/193 |
| 6,876,956 | B1 | * | 4/2005 | Cirak et al. ....................... 703/2 |
| 7,131,105 | B2 | * | 10/2006 | Lorenz et al. .................. 716/102 |

(Continued)

OTHER PUBLICATIONS

Marc Alexa; Differential Coordinates for Local Mesh Morphing and Deformation; Feb. 14, 2003; The Visual Computer 19: 105-114.*

(Continued)

*Primary Examiner* — Jermie Cozart
*Assistant Examiner* — Bayan Salone
(74) *Attorney, Agent, or Firm* — Fraser Clemens Martin & Miller LLC; James D. Miller (57) ABSTRACT

A method for manufacturing a stamped part, such as a bipolar plate for a fuel cell, includes the steps of: providing an original model of the bipolar plate; and performing a compensation process on the original model, the compensation process including a two step morphing process based upon a prediction of spring back. The two step morphing process provides a compensated model of the stamped part. A compensated die face may be created based on the compensated model of the stamped part. The stamped part manufactured with the compensated die face has spring back compensation.

20 Claims, 12 Drawing Sheets

(56) References Cited

U.S. PATENT DOCUMENTS

| | | | |
|---|---|---|---|
| 7,194,388 B2 * | 3/2007 | Chu et al. | 703/2 |
| 7,258,263 B2 * | 8/2007 | Sigler et al. | 228/157 |
| 7,272,524 B2 * | 9/2007 | Brogardh | 702/95 |
| 7,423,656 B2 * | 9/2008 | Zhao et al. | 345/646 |
| 7,493,243 B2 * | 2/2009 | Choi et al. | 703/2 |
| 7,604,888 B2 * | 10/2009 | Rock et al. | 429/444 |
| 7,734,118 B2 * | 6/2010 | Chaudhury et al. | 382/300 |
| 7,855,031 B2 * | 12/2010 | Spencer | 429/512 |
| 8,014,892 B2 * | 9/2011 | Glasser | 700/175 |
| 8,036,769 B2 * | 10/2011 | Glasser | 700/175 |
| 8,129,075 B2 * | 3/2012 | Owejan et al. | 429/513 |
| 8,163,431 B2 * | 4/2012 | Lemasson et al. | 429/457 |
| 8,209,157 B2 * | 6/2012 | Hallquist | 703/2 |
| 8,465,863 B2 * | 6/2013 | Weber et al. | 429/120 |
| 8,465,879 B2 * | 6/2013 | Miller et al. | 429/457 |
| 2003/0182005 A1 * | 9/2003 | Chu et al. | 700/97 |
| 2005/0143962 A1 * | 6/2005 | Keane et al. | 703/1 |
| 2006/0104544 A1 * | 5/2006 | Chaudhury et al. | 382/299 |
| 2006/0139347 A1 * | 6/2006 | Choi et al. | 345/419 |
| 2008/0040080 A1 * | 2/2008 | Bae et al. | 703/1 |
| 2012/0129065 A1 * | 5/2012 | Rock et al. | 429/430 |
| 2012/0129073 A1 * | 5/2012 | Spencer et al. | 429/460 |

OTHER PUBLICATIONS

Altair Hyperworks; HyperMorph 10.0; http://blog.altair.co.kr/wp-content/uploads/2011/03/hypermorph.pdf; Jan. 1, 2008; pp. 1-58.*

US Patent Trademark Office EIC STIC search; Nov. 13, 2014; pp. 1-12.*

* cited by examiner

METHOD TO IMPROVE THE DIMENSIONAL ACCURACY AND SURFACE QUALITY FOR LARGE SPRING BACK COMPENSATION FOR FUEL CELL BIPOLAR PLATE FORMING

FIELD OF THE INVENTION

This invention relates to stamped parts such as bipolar plates for fuel cell stacks and, more particularly, to a method for manufacturing stamped parts to compensate for spring back in the stamped parts.

BACKGROUND OF THE INVENTION

A fuel cell has been proposed as a clean, efficient and environmentally responsible power source for various applications. In particular, individual fuel cells can be stacked together in series to form a fuel cell stack capable of supplying a quantity of electricity sufficient to power an electric vehicle. The fuel cell stack has been identified as a potential alternative for a traditional internal-combustion engine used in modern vehicles.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA).

In a typical PEM-type fuel cell, the MEA is sandwiched between diffusion media or diffusion layers that are formed from a resilient, conductive, and gas permeable material such as carbon fabric or paper. In certain designs, the cathode and the anode are also formed on the diffusion media and sandwich the electrolyte membrane. The diffusion media serve as current collectors for the anode and cathode as well as provide mechanical support for the MEA. The diffusion media and MEA are pressed between a pair of electronically conductive bipolar plates which also serve as current collectors for collecting the current from the electrochemical fuel cell reaction.

The bipolar plate typically includes two thin, facing metal unipolar plates. One of the metal unipolar plates is an anode plate that defines a flow path on one outer surface thereof for delivery of hydrogen reactant to the anode of the MEA. An outer surface of the other unipolar plate, known as a cathode plate, defines a flow path for the oxidant reactant for delivery to the cathode side of the MEA. When the unipolar plates are joined, the joined surfaces define a path for a coolant fluid to flow therethrough.

The unipolar plates are typically produced from a formable metal that provides suitable strength, electrical conductivity, and corrosion resistance. In particular, stamped thin metallic sheets are typically used for the anode and cathode unipolar plates when forming the bipolar plate. For example, the metallic sheet may be less than about 100 micron in thickness. However, the thin material and high strength of the stainless steel material cause significant lateral (in-plane) spring back. It has been shown that the spring back can reach over 400-500 micron. The spring back causes an uneven distribution of a flow field stamped in the plate assembly, undesirably affecting a functionality of the resulting bipolar plate and fuel cell stack.

Figure 1:
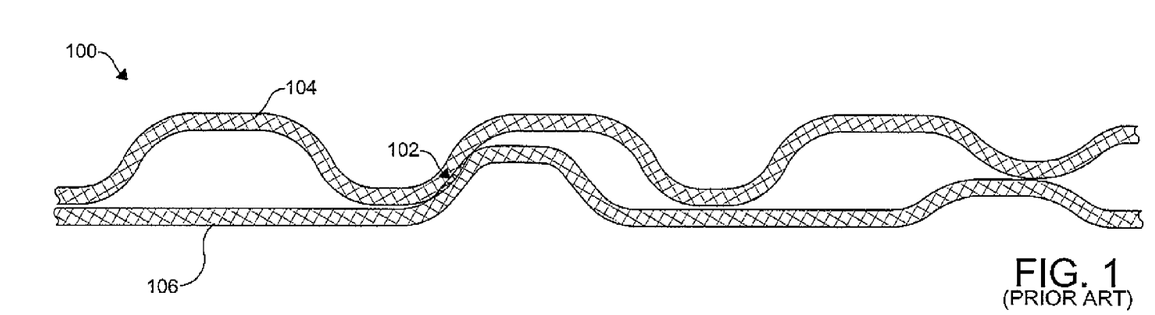
FIG. 1 is a schematic fragmentary side elevational view of a finite element model for a bipolar plate without compensation, the bipolar plate formed from a cathode plate and an anode plate and having an interference between them due to spring back.

As shown in FIG. 1, the large spring back in the bipolar plate 100 may far exceed typical tolerances. The large spring back, if not sufficiently compensated for in a tool used to form the bipolar plate 100, may cause an interference 102 between cathode and anode unipolar plates 104, 106 during assembly of the bipolar plate 100.

To compensate for the lateral bipolar plate spring back, a method of using either global or local morphing to design and cut dies for stamping the bipolar can be used. However, for relatively large spring back (compared to feature size and design tolerance), for example, over 200 microns, the one step methods can undesirably cause severe surface distortion when trying to achieve necessary fidelity due to the large surface deformation.

There is a continuing need for a method providing stable and reliable surface compensation with high accuracy and surface quality for large lateral spring back of fuel cell bipolar plates, to consistently meet the requirements of manufacturing and assembly.

SUMMARY OF THE INVENTION

In concordance with the instant disclosure, a method providing stable and reliable surface compensation with high accuracy and surface quality for large lateral spring back of fuel cell bipolar plates, to consistently meet the requirements of manufacturing and assembly, has surprisingly been discovered.

To solve the large spring back compensation issue, the two step compensation method of the present disclosure has been developed, and in a particular embodiment includes the following steps.

1. The lateral spring back is predicted by using 3D finite element method. Input data for nominal and sprung shapes of a stamped bipolar plate is obtained from a 3D FEA model.

2. Due to the material thinning in the plastic deformation, the nominal stamped part shape does not exactly match with the nominal CAD data. A projection along the surface normal is performed to bring the nodes of nominal part back to the CAD surfaces and the corresponding adjustment is made to the sprung shape. This process generates a projected pair of nominal and sprung shape data set for compensation.

3. The first step morphing is global morphing with input of original CAD surface and the projected nominal and sprung data from step 2. The key objective of the first stage morphing is to modify (i.e., stretch or shrink) the plate globally to its approximate final shape using open boundary condition without focusing on the local feature details. Key parameters are determined on the number of control point of volume B-spline and maximum number of intervals for the basis function based on the bipolar plate dimensions.

4. The second step morphing is based on the surface modified by the first stage morphing. The nominal shape is the output from the first stage morphing, and the target shape for compensation is the same data as used in the first stage morphing. A matrix of overlapping local morphing boxes is used to cover the entire plate so that the surface can be morphed to the required target details, for example, within 1 micron tolerance. In the second stage, the surface deformation within each local box is limited to very small amount (for example, a few microns to 20-30 microns compared to a few hundred microns of large spring back). Therefore, the surface distortion is avoided and a good surface quality can be achieved (i.e., same as an original CAD surface).

The two step morphing is revolutionary compared to a one step approach. It takes the advantages of both global morphing and local box morphing. In addition to bipolar plates for fuel cells, the present two step method can also be used for large and twisting spring backs for high strength steel and aluminum auto parts. The spring back for roof rails can easily reach 20 mm, for example. The prior art compensation processes cannot completely eliminate the spring back effectively. The two step method is a viable alternative to solve this type of large spring back compensation in stamped parts of all kinds.

In another embodiment, the two step method of the present disclosure uses the global compensation to first morph surfaces for large nonlinear portion of spring back, and then employs a local morphing method to compensate the remaining spring back with the focus on the fine and detail features. The method advantageously provides compensated CAD surfaces with the same quality as the original design for both large and small spring back, and meets accuracy requirements, for example, 1 micron tolerance, consistently for large spring back. A file size of the compensated CAD file generated with the method is much smaller than with prior art methods. The compensated CAD also requires relatively short pre-processing time and computer run time, and can be used directly for machining purposes.

In a further embodiment, a method for manufacturing a stamped part includes the steps of providing an original model of the stamped part, and performing a compensation process on the original model. The compensation process includes a two step morphing process. The two step morphing process provides a compensated model of the stamped part. A compensated tool such as a die face is created based on the compensated model of the stamped part.

In an exemplary embodiment, the stamped part is a bipolar plate for a fuel cell stack, and the two step morphing process includes a global surface morphing process and a local surface morphing process.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 2:
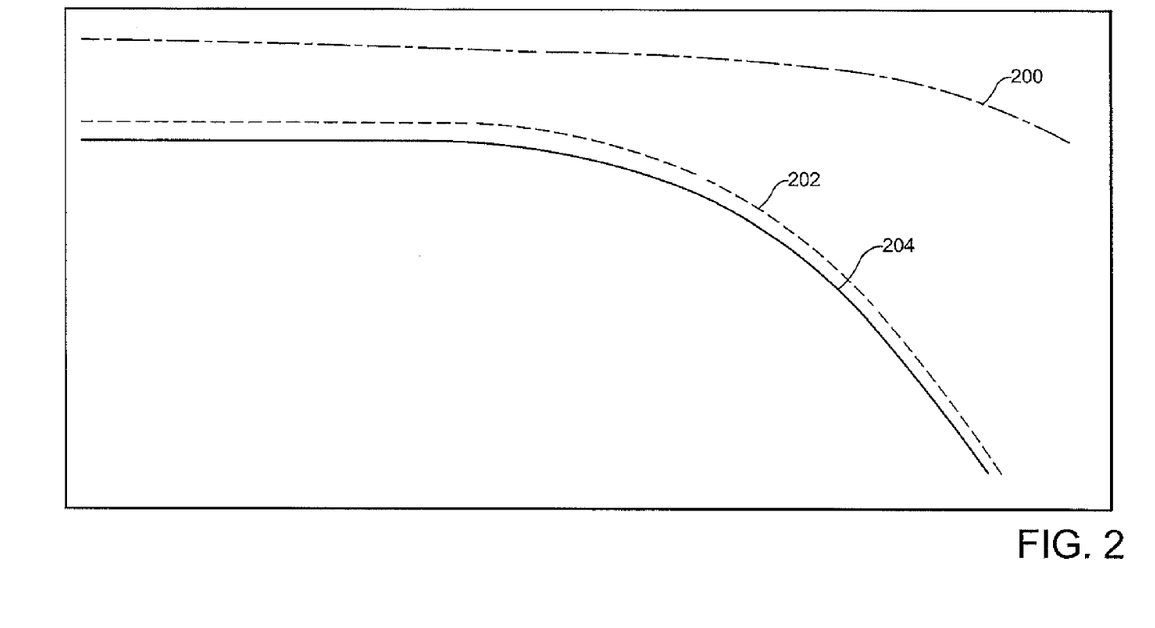
FIG. 2 is a schematic illustration of a two step morphing process of the present disclosure to account for spring back.

FIG. 2 schematically depicts a method for designing and manufacturing a stamped part according to the present disclosure. Although the stamped part is described largely herein as a bipolar plate for a fuel cell stack, it should be appreciated that the method of the present disclosure is also applicable to other stamped parts exhibiting spring back. The method first includes providing an original model of the stamped part, for example, identified by an original surface 200. A compensation process is then applied to the original model. The compensation process including a two step morphing process. The two step morphing process includes a global surface morphing process and a local surface morphing process. The first step global morphing process moves the original surface 200 to a global morphed surface 202 for large spring back compensation, for example, spring back over 200 microns (compared to part features in the case of bipolar plates), based upon a prediction of spring back in the stamped part. The second step local surface morphing process moves the global morphed surface 202 to a target morphed surface 204. The target morphed surface 204 compensates for detailed features of the stamped part. The two step morphing process provides a compensated model of the stamped part having the target morphed surface 204. A compensated tool such as a die face based on the compensated model of the stamped part may be created therefrom. The stamped part manufactured with the compensated tool has superior dimensions in comparison to a tool cut based simply upon desired or nominal dimensions of the stamped part.

Figure 3:
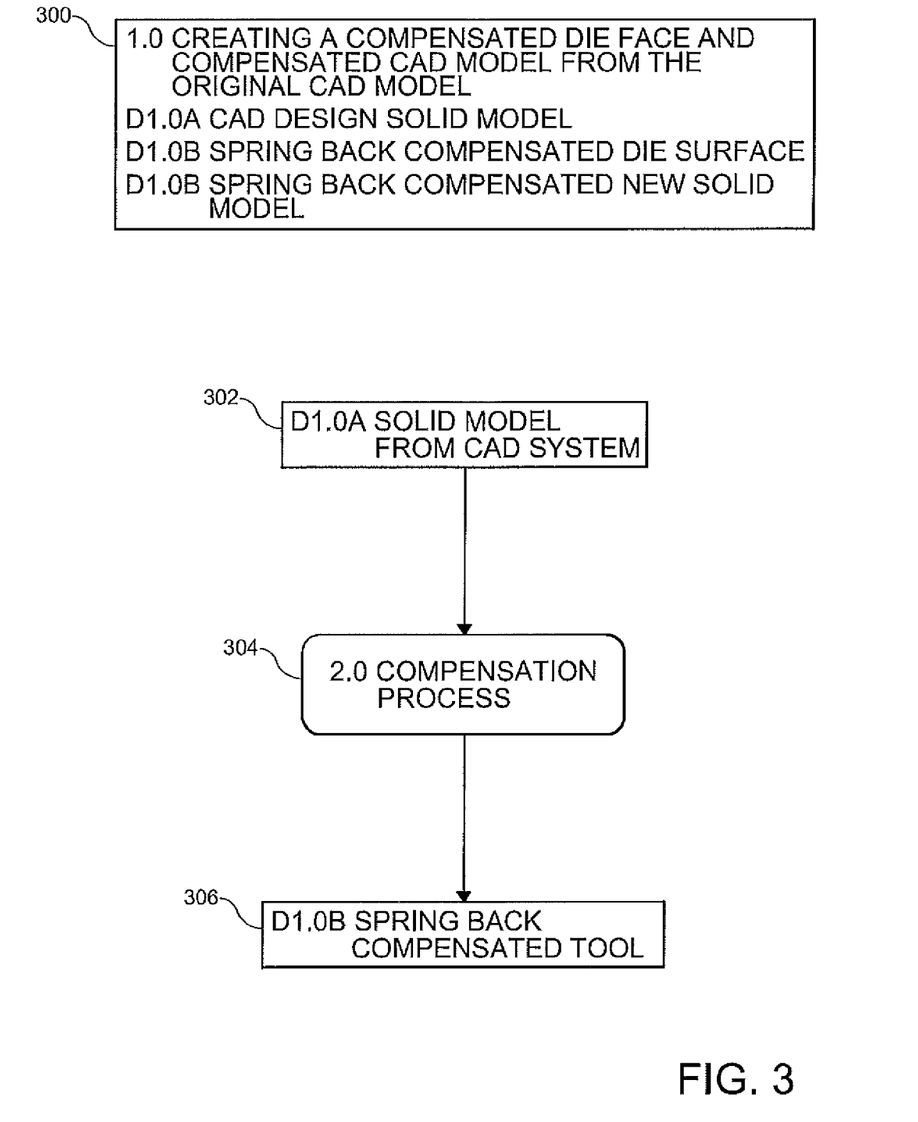
FIG. 3 is a flow diagram illustrating a primary method for manufacturing a spring back compensated bipolar plate for a fuel cell stack according to the present disclosure.

FIG. 3 shows a primary process 300 for creating a compensated die face and compensated CAD model from an original CAD model, according to one embodiment of the present disclosure. The primary process 300 begins with an original model 302, for example, a solid model from a CAD system. The original model 302 is employed in a compensation process 304 to generate a spring back compensated model. A spring back compensated tool such as a die surface can be generated from the spring back compensated model in a manufacturing step 306.

Figure 4:
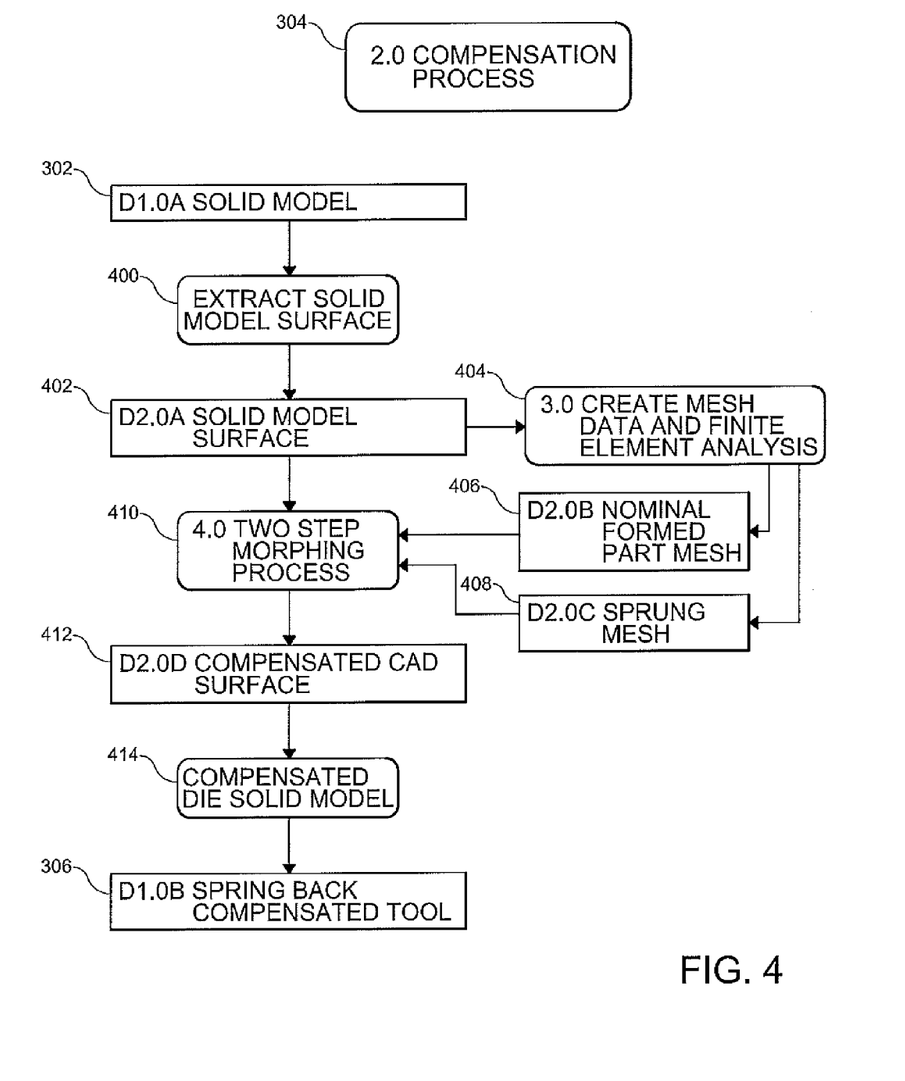
FIG. 4 is a flow diagram illustrating a compensation process of the designing and manufacturing method of the present disclosure.

The compensation process 304 is illustrated in FIG. 4. The compensation process 304 first includes the step of extracting 400 a model surface 402 from the original model 302. The solid model surface 402 is used to create mesh data and for finite element analysis in a step 404, resulting in nominal formed part mesh data 406 and sprung mesh data 408. The solid model surface 402, the nominal formed part mesh data 406, and the sprung mesh data 408 are used in a two step morphing process 410 to provide a compensated surface 412. The compensated surface 412 is added to a die model 414 used to create the spring back compensated tool 306.

Figure 5:
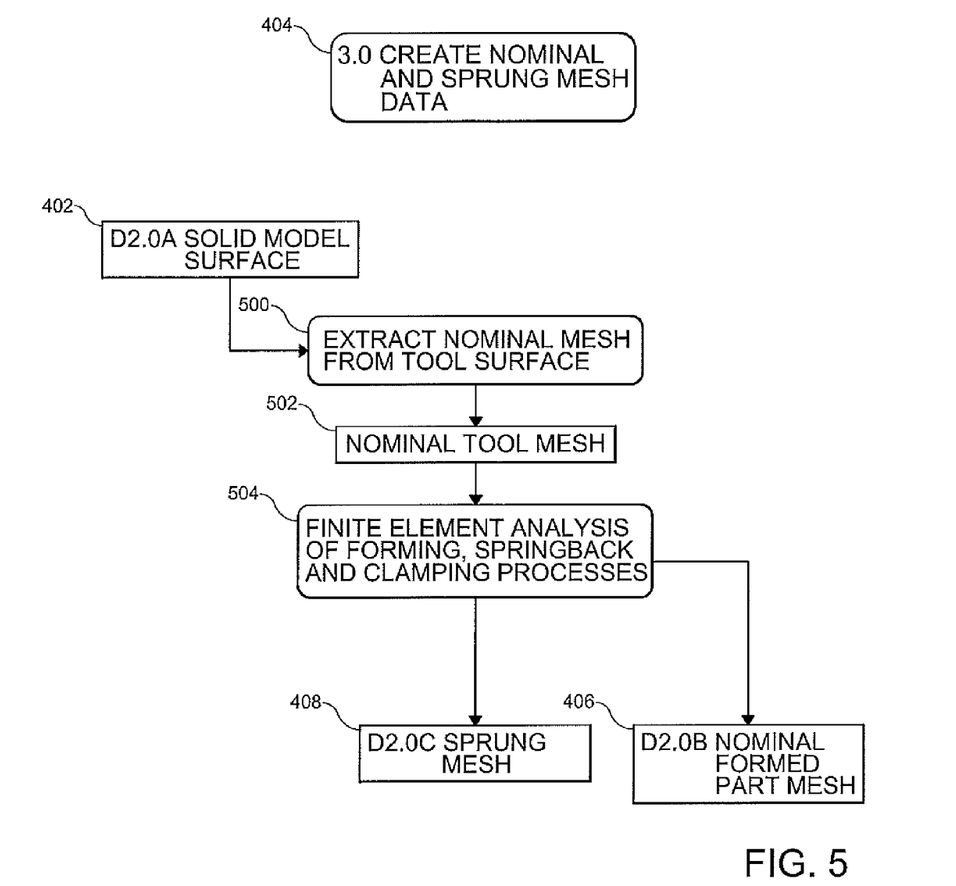
FIG. 5 is a flow diagram illustrating an analysis of an original model in the compensation process depicted in FIG. 4.

Referring now to FIG. 5, the step 404 for creating the mesh data and for the finite element analysis is further shown. The step 404 first includes an extraction step 500 in which nominal tool mesh data 502 is extracted from a tool surface used to generate the model surface 402 from the original model 302. The nominal tool mesh data 502 is used in a finite element analysis 504 of forming, spring back, and clamping processes. The finite element analysis 504 results in the nominal formed part mesh 406, and sprung part mesh 408.

Figure 6:
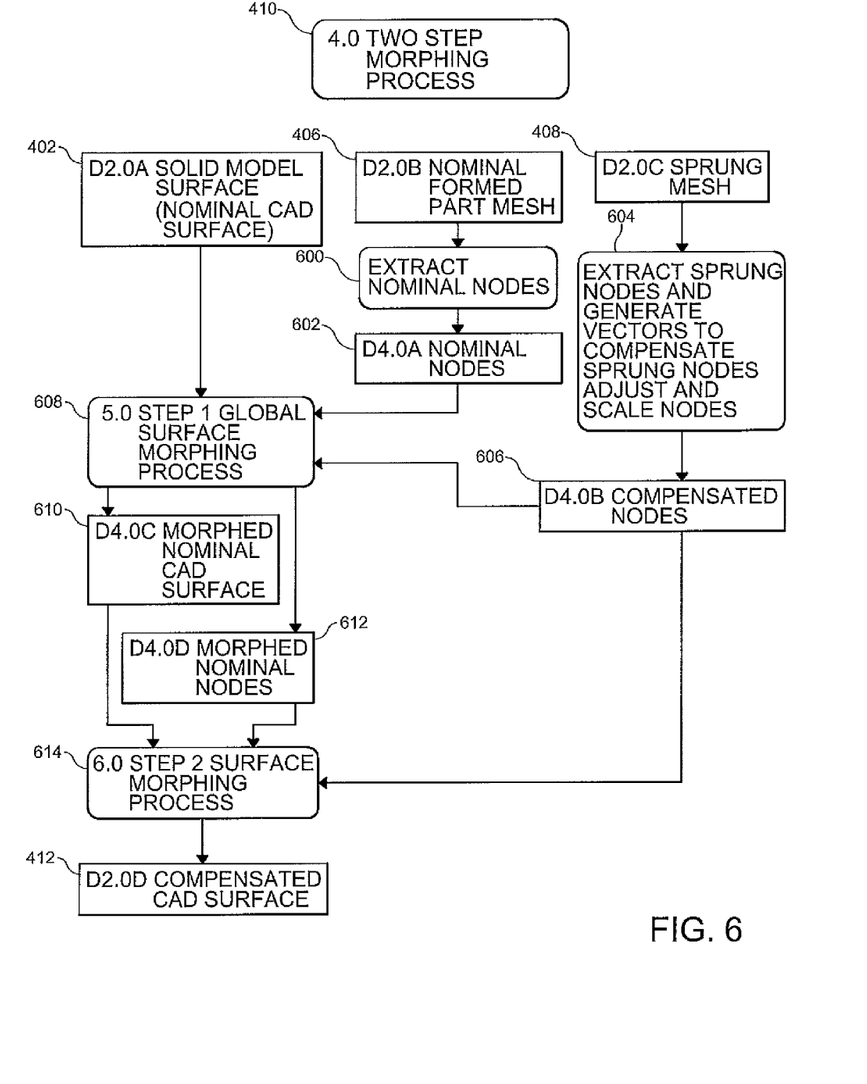
FIG. 6 is a flow diagram illustrating a two step morphing process in the compensation process depicted in FIG. 4.

The two step morphing process 410 is further depicted in FIG. 6. The two step morphing process 410 begins with a step 600 of extracting nominal nodes 602 from the nominal formed part mesh 406, and a step 604 of extracting sprung nodes and generating vectors to adjust and scale the sprung nodes to provide compensated nodes 606. The nominal nodes 602 and the compensated nodes 606 are employed in a first step global surface morphing process 608. The first step global surface morphing process 608 results in a morphed nominal surface 610 and morphed nominal nodes 612. The morphed nominal surface 610 and the morphed nominal nodes 612 are then employed, together with the compensated nodes 606, in a second step local surface morphing process 614 to provide the compensated surface 412.

Figure 7:
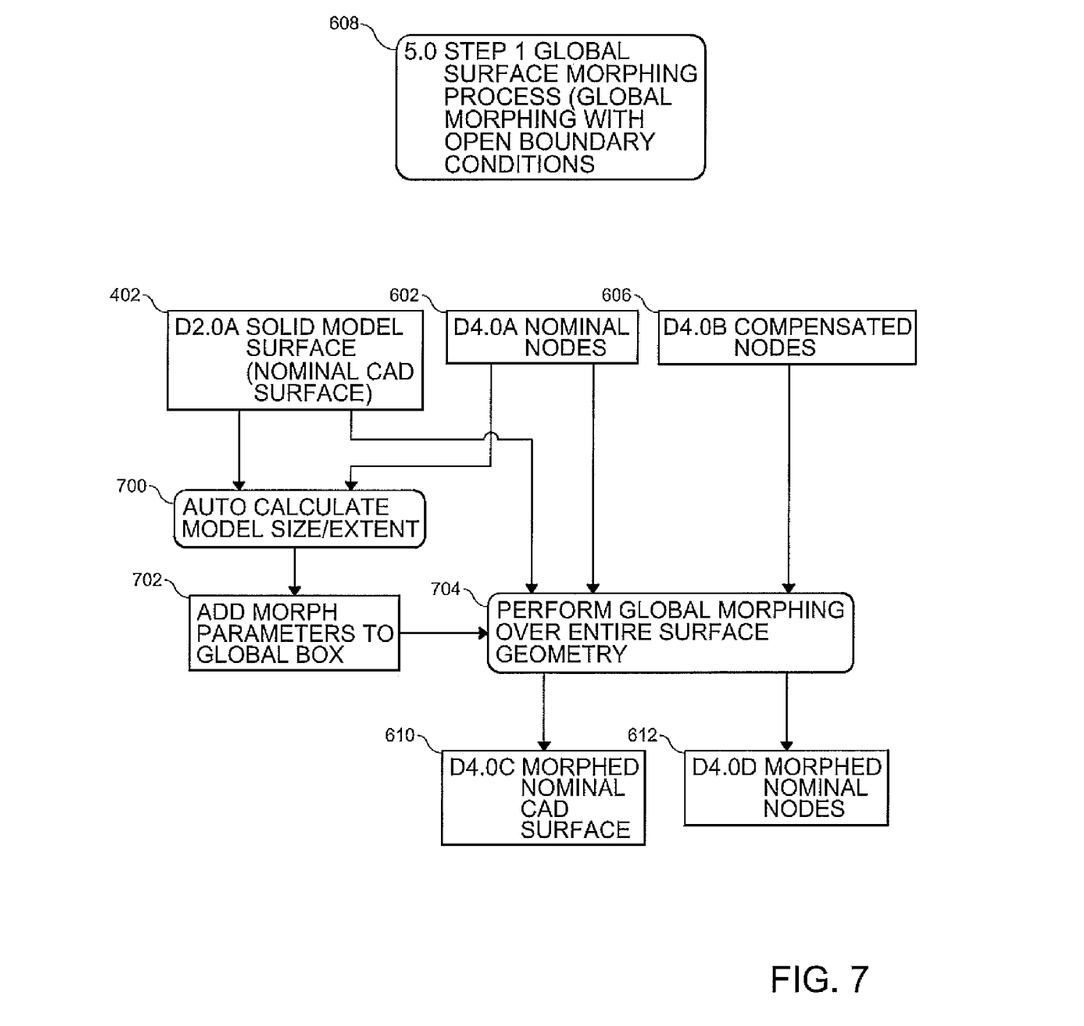
FIG. 7 is a flow diagram illustrating a global surface morphing process in the two step morphing process depicted in FIG. 6.

With reference to FIG. 7, the first step global surface morphing process 608 is further shown. The model surface 402, the nominal nodes 602, and the compensated nodes 606 are used in the first step global surface morphing process 608. The model surface 402 and the nominal nodes 602 are used in a step 700 of calculating a model size or extent. The calculated parameters from the step 700 are then added in a step 702 to create a global box. The model surface 402, the nominal nodes 602, and the compensated nodes 606 are then used, together with the global box to perform a global morphing 704 over an entire surface geometry of the model surface 402. The global morphing 704 results in the morphed nominal surface 610 and the morphed nominal nodes 612.

Figure 8:
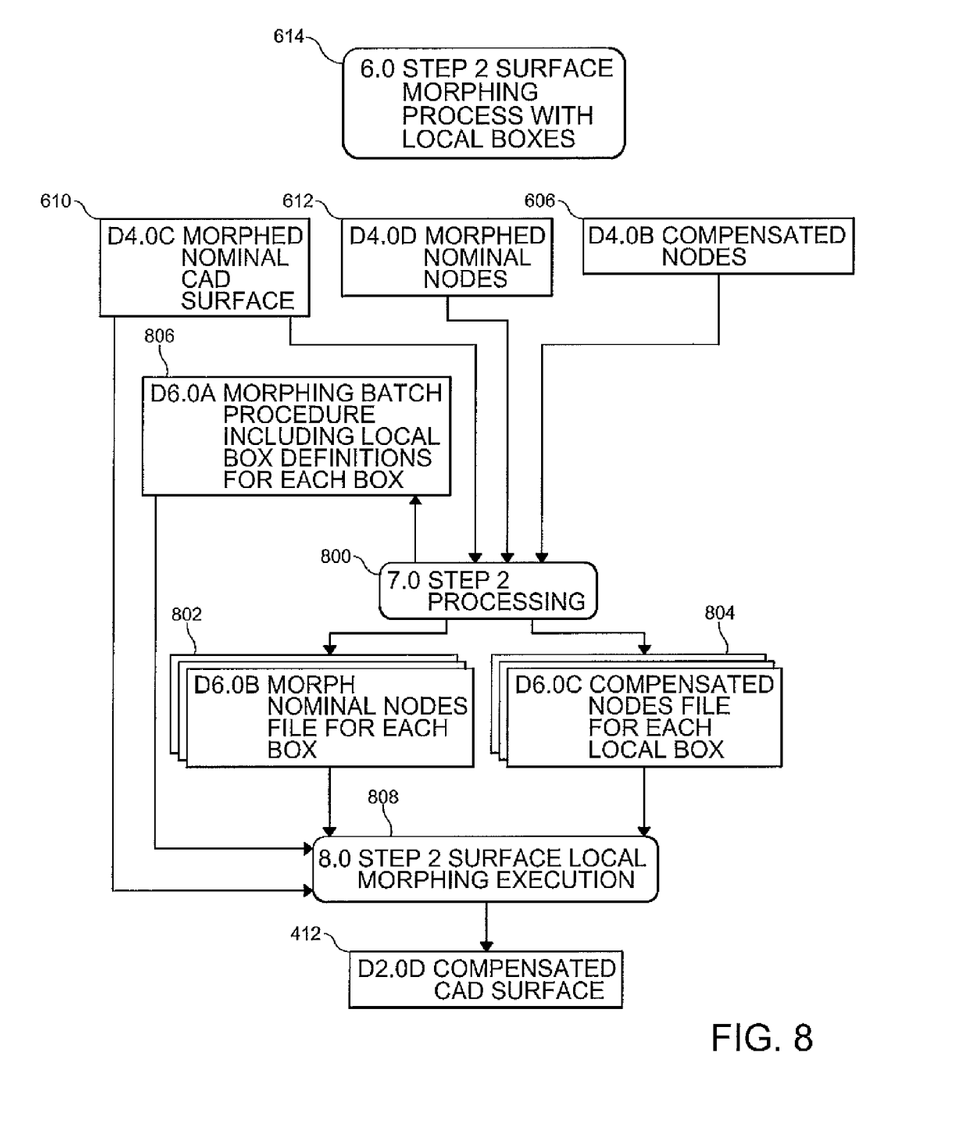
FIG. 8 is a flow diagram illustrating a local box surface morphing process in the two step morphing process depicted in FIG. 6.

FIG. 8 further depicts the second step local surface morphing process 614. The morphed nominal surface 610 and the morphed nominal nodes 612 from the first step global surface morphing process 608 are used in a preprocessing step 800 to generate morphing nominal nodes file 802 for each local box 1300 (schematically depicted in FIGS. 13 and 14) and a compensated nodes file 804 for each local box 1300. The preprocessing step 800 further generates a morphing batch procedure 806, including local box definitions for each local box. The morphing nominal nodes 802, the compensated nodes files 804, and the morphing batch procedure 806 are employed in a surface local morphing execution step 808 to generate the compensated surface 412. It should be appreciated that local boxes 1300 overlap and a subset of nominal and compensation points in each local box 1300 through the second state morphing are tracked in order to reduce manual effort, computer time, and RAM memory requirements.

Figure 9:
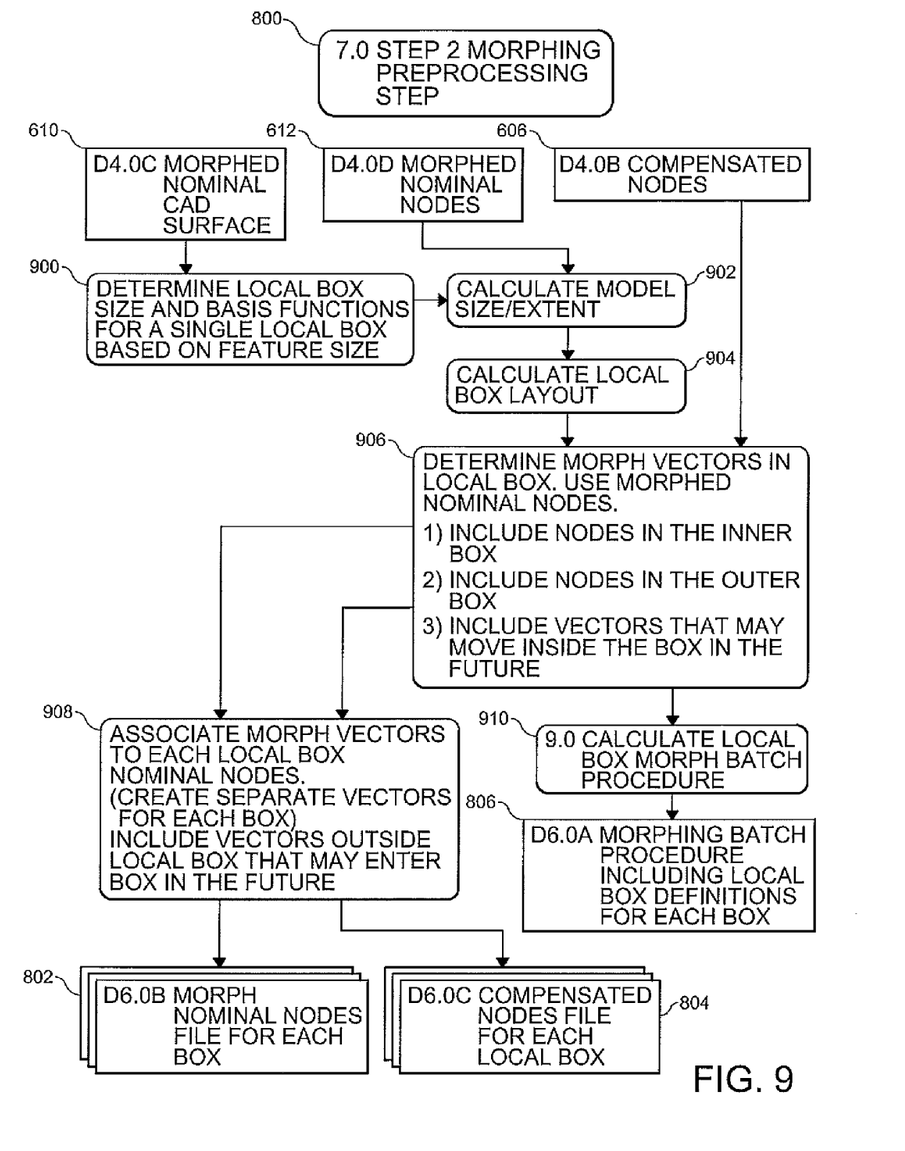
FIG. 9 is a flow diagram illustrating a preprocessing step in the local box surface morphing process depicted in FIG. 8.
Figure 13:
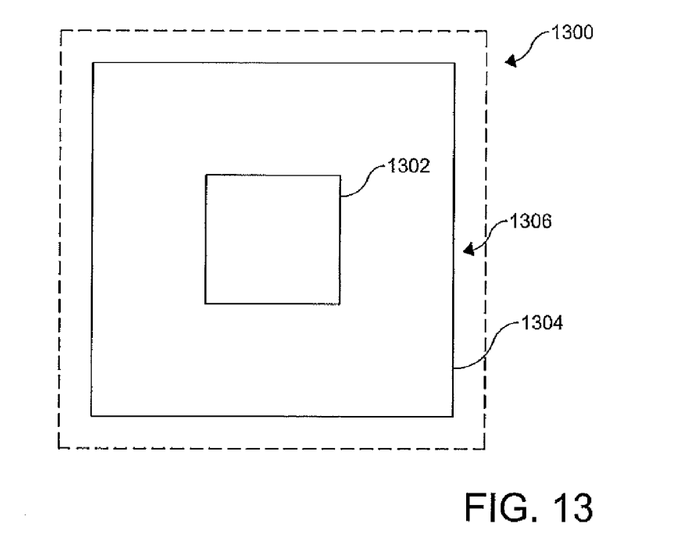
FIG. 13 is a schematic illustration of a single local morph box, showing an inner box, and outer box, and a region where morphing vectors may shift inside the single local morph box.

The preprocessing step 800 of the second step local surface morphing process 614 is further illustrated in FIG. 9. The preprocessing step 800 includes a step 900 of determining local box size and basis functions for a single local box 1300 based on feature sizes of the morphed nominal surface 610. The determined local box size and basis functions for a single local box 1300 are used together with the morphed nominal nodes 612 in a step 902 to calculate a model size or extent, and subsequently in a step 904 to calculate a local box layout. In a next step 906, morph vectors are determined in each local box 1300 using the morphed nominal nodes 612. As shown in FIG. 13, each local box 1300 includes an inner box 1302, an outer box 1304, and a region 1306 where morphing vectors may shift inside the local box 1300. The morph vectors are determined for nodes in an inner box 1302 and nodes in the outer box 1304. The morph vectors that may move inside the local box 1300 in the future are also determined in the step 906. In a step 908, the morph vectors are subsequently associated to each of the nominal nodes of each local box 1300, to thereby provide the morphing nominal nodes file 802 for each local box 1300, and the compensated nodes file 804 for each local box 1300. In a step 910, the local box morph batch procedure 806 is also calculated.

Figure 10:
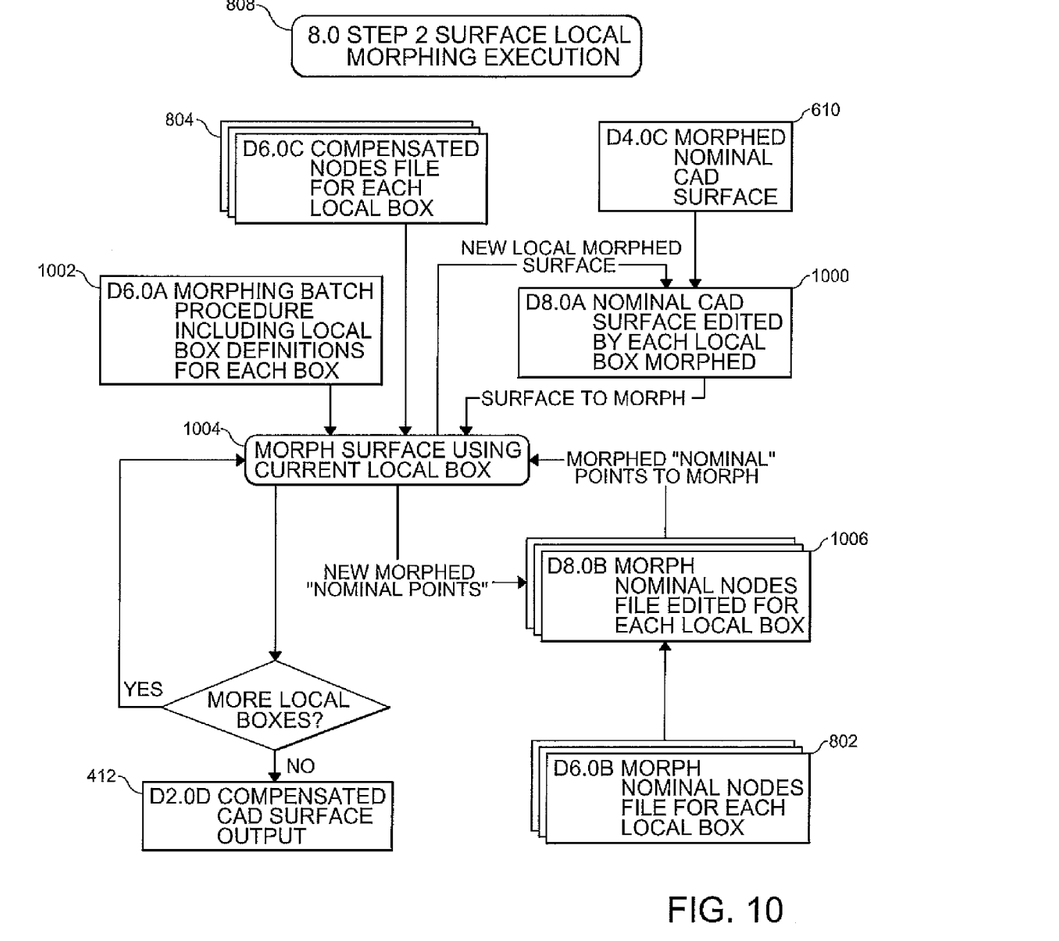
FIG. 10 is a flow diagram illustrating an execution of the local box surface compensation in the two step morphing process depicted in FIG. 8.

Referring now to FIG. 10, the execution step 808 of the second step local surface morphing process 614 is further shown. The execution step 808 employs the compensated nodes files 804 and the morphed nominal CAD surface 610 to edit 1000 the nominal surface by each local box 1300 morphed, and the morphing batch procedure 1002 including local box definitions for each local box 1300. In a step 1004, the nominal surface is morphed using a current one of the local boxes 1300. The nominal nodes 802 for each local box 1300 may also be edited in a step 1006 for each local box 1300. The process is repeated until no more local boxes 1300 remain to be morphed, and results in the compensated surface 412.

Figure 11:
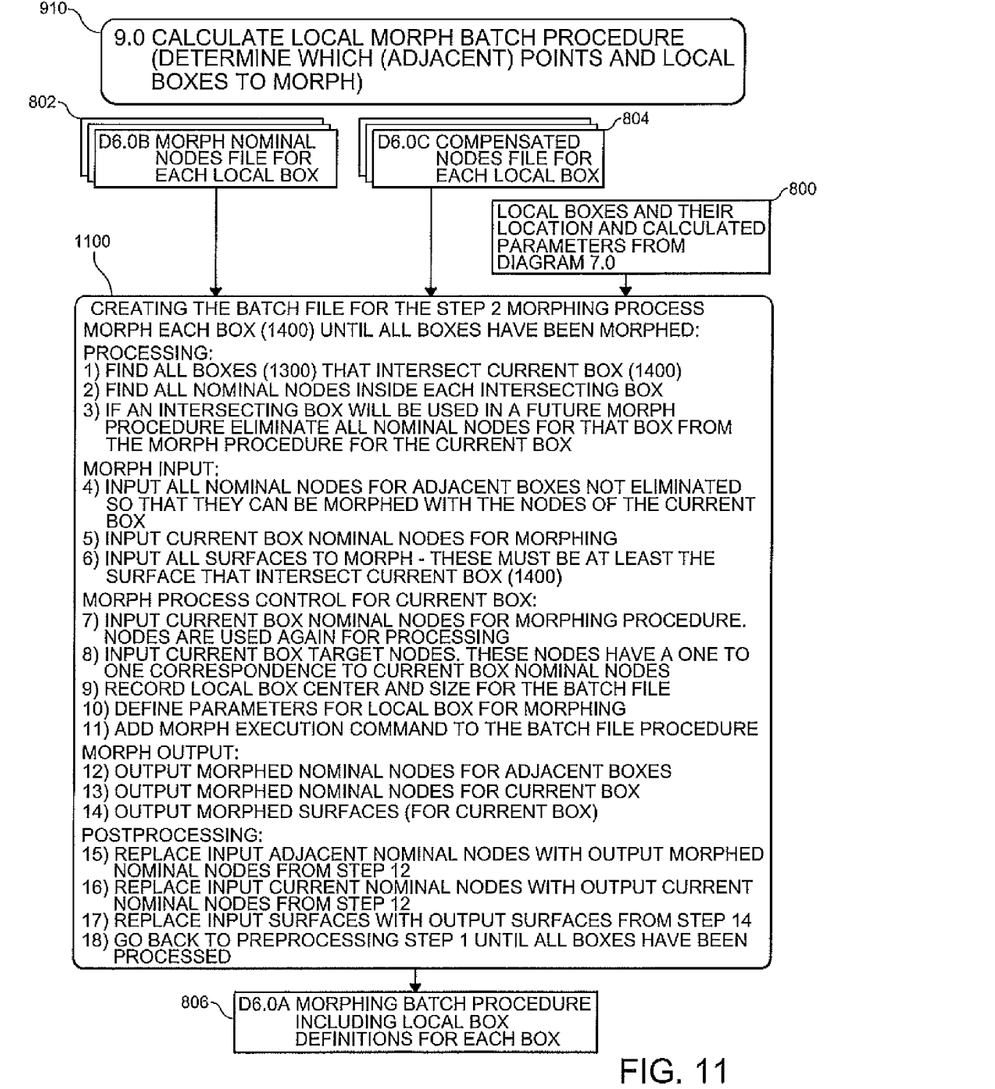
FIG. 11 is a flow diagram illustrating a calculation of a local morph batch procedure in the two step morphing process depicted in FIG. 9.

FIG. 11 further depicts the step 910 for calculating the local morph batch procedure, which determines which adjacent points and local boxes 1300 to morph. The step 910 uses the morph nominal nodes file 802 for each local box 1300, the compensated nodes file 804 for each local box 1300, and the local boxes 1300 and their location and calculated parameters from the preprocessing step 800 in a multi-step routine 1100. The multi-step routine 1100 is performed on each local box 1300, and includes preprocessing (steps 1 to 3), data input (steps 4 to 6), morph process control for the current box (steps 7 to 11), morph data output (steps 11 to 14), and post-processing (steps 15 to 19). During this process, there always remains a one to one correspondence between each nominal and each target node, even though only the nominal nodes are changed. These steps include the following steps:

1) Find all boxes 1300 that intersect current box 1400.

2) Find all nominal nodes inside each intersecting box 1300.

3) If an intersecting box will not be used in a future morph procedure, eliminate all nominal nodes for that box from the morph procedure for the current box.

Morph Input:

4) Input all nominal nodes for adjacent boxes not eliminated so that they can be morphed with the nodes of the current box 1400.

5) Input current box nominal nodes for morphing.

6) Input all surfaces to morph—These must be at least the surfaces that intersect current box (1400).

Morph Process Control for Current Box:

7) Input current box nominal nodes for morphing procedure. The nodes are used again for processing.

8) Input current box target nodes. These nodes have a one to one correspondence to current box nominal nodes.

9) Record local box center and size for the batch file.

10) Define parameters for local box for morphing.

11) Add morph execution command to the batch file procedure. This is the morph batch procedure 806.

Morph Output:

12) Output morphed nominal nodes for adjacent boxes.

13) Output morphed nominal nodes for current box.

14) Output morphed surfaces (for current box).

Post Processing:

15) Replace input adjacent nominal nodes with output morphed nominal nodes from step 12.

16) Replace input current nominal nodes with output current nominal nodes from step 13.

17) Replace input surfaces with output surfaces from step 14.

18) Go back to preprocessing step 1 until all boxes have been processed.

19) Output morphed surfaces.

Figure 12:
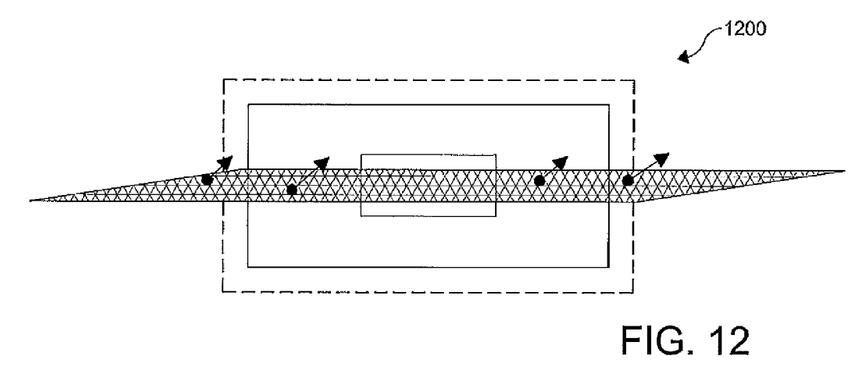
FIG. 12 is a schematic illustration of a mesh surface embedded in a single local box used in the compensation process of the present disclosure.

FIG. 12 further depicts a mesh surface 1200 embedded in a single local box used in the compensation process of the present disclosure.

Figure 14:
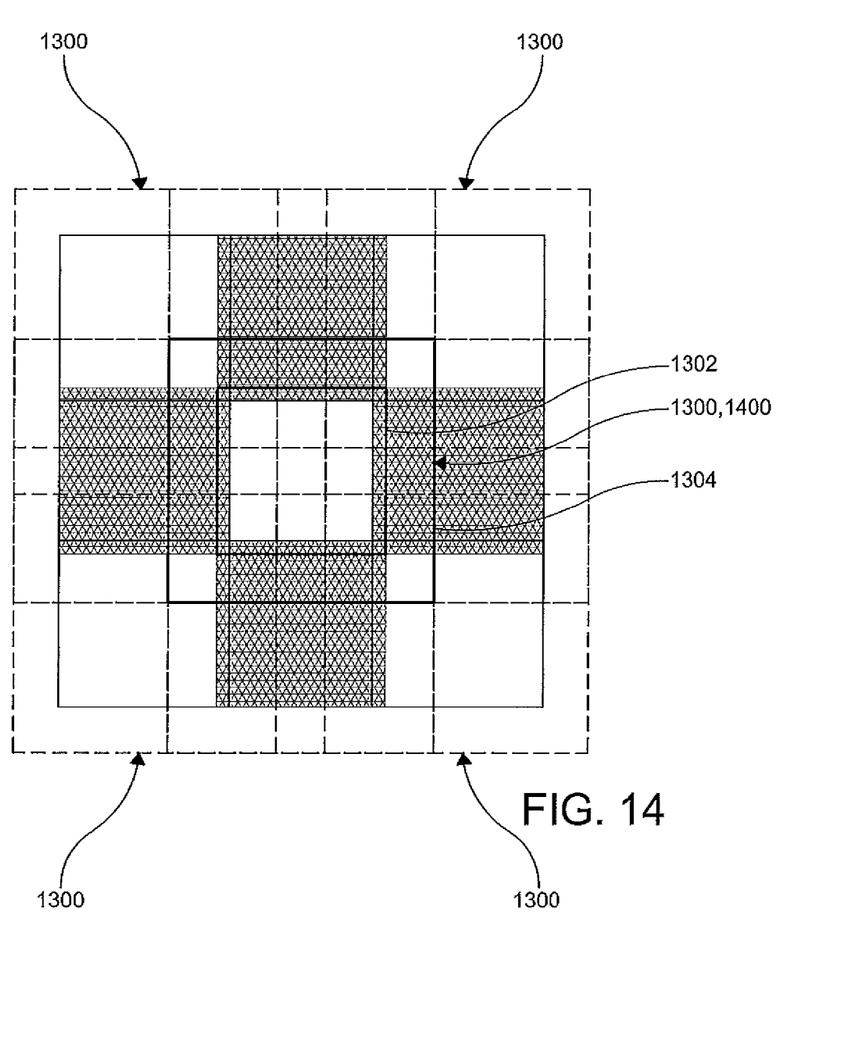
FIG. 14 is a schematic illustration of a plurality of local morph boxes overlayed to perform morphing, and showing inner boxes of each of the local morph boxes overlapping for fidelity.

Referring to FIG. 14, a schematic illustration of a plurality of the local boxes 1300 according to a particular embodiment is shown. When points in the central morph box 1400 are morphed (points not shown), the morph points from the surrounding local boxes are also affected. The local boxes 1300 are overlayed to perform morphing, with all inner boxes 1302 of the local boxes 1300 overlapped for purposes of fidelity. The effect of the central local morph box 1400 is accounted for when the surrounding local boxes 1300 are morphed. A book keeping method is developed and coded into the automated two step morphing process 800 to keep track of local morphing.

EXPERIMENTAL

The two step method of the present disclosure has been applied to a finite element model of an original cathode plate in a first compensation trial. The finite element model shows that the original plate design will cause a total of 273 microns lateral spring back. Lateral compensation (100% or 1 to 1) plus 5 micron channel depth compensation was performed using the two step method based on a first spring back prediction. This was calculated as part of step 604, described hereinabove. After the compensation, the finite element modeling showed that the compensated surface shape will yield 295 microns total lateral spring back. Sectional comparison of sprung shapes with the nominal CAD model shows that the 100% compensation does not completely compensate for the lateral spring back. There is about a 13 micron deviation of the channel shape at the edge of the active area if the mid section of the active area is lined up with the nominal data, where the channel depth is shown fully compensated by 5 microns.

Based on the results from the first compensation trial, a second compensation trial was performed with 107% lateral compensation amount (over compensation) plus 5 micron channel depth compensation using the two step method. The finite element spring back analysis showed that the new compensation will generate about 295 microns lateral spring back. The sectional comparisons shows that the sprung shape overlaps with the nominal shape, indicating that both lateral spring back and channel depth flattening are compensated completely with the second compensation trial.

Advantageously, the method of the present disclosure provides high accuracy and surface quality compensation for large spring back, and reduces the time and complexity of bipolar plate product design, development, tryout and manufacturing. The present method also provides a new path for spring back compensation, and can be used for large and twisting spring back compensation for other types of stamped parts such as body panels made of high strength steel and aluminum for all vehicle types, as particular nonlimiting examples. The high precision and sub-micron compensation of the present method also may be used for surface defect or surface low compensation, as surface quality is one of the toughest issues facing the outer body panel manufacturing industry.

While certain representative embodiments and details have been shown for purposes of illustrating the invention, it will be apparent to those skilled in the art that various changes may be made without departing from the scope of the invention, which is further described in the following appended claims.

What is claimed is:

1. A method for manufacturing a stamped part, the method comprising the steps of: providing an original model of the stamped part for a nominal shape of the stamped part and a sprung shape of the stamped part; generating a projection along a nominal surface of the nominal shape; identifying areas of plastic deformation in the nominal shape, with nodes of the nominal shape adjusted at the areas of plastic deformation to match a geometry of an original CAD surface of the nominal shape; performing a compensation process on the original model, the compensation process including a two-step morphing process, the two step morphing process providing a compensated model of the stamped part; and creating a compensated tool based on the compensated model of the stamped part, the stamped part manufactured with the compensated tool having spring back compensation.

2. The method of claim 1, wherein the stamped part is a bipolar plate for a fuel cell.

3. The method of claim 1, wherein the two step morphing process includes a global surface morphing process and a local surface morphing process, the global surface morphing process including a projected nominal data set defined by the adjusted nodes and a sprung data set of the sprung shape of the stamped part.

4. The method of claim 3, wherein the global surface morphing process morphs the nominal surface of the original model to compensate for large spring back of the stamped part and the local surface morphing process morphs the compensated surface from the global morphing to compensate for detail features of the stamped part.

5. A method for manufacturing a bipolar plate for a fuel cell, the method comprising the steps of: providing an original model of the bipolar plate for a nominal shape of the bipolar plate and a sprung shape of the bipolar plate; generating a projection along a nominal surface of the nominal shape; identifying areas of plastic deformation in the nominal shape, with nodes of the nominal shape adjusted at the areas of plastic deformation to match a geometry of an original CAD surface; employing a projection along a nominal surface of the sprung shape; identifying areas of plastic deformation in the sprung shape, with nodes of the sprung shape adjusted at the areas of plastic deformation to match a geometry of the original CAD surface; performing a compensation process on the original model, the compensation process including a two-step morphing process having a global surface morphing process and a local surface morphing process, the two step morphing process providing a compensated model of the bipolar plate; and creating a compensated die face based on the compensated model of the bipolar plate, the bipolar plate manufactured with the compensated die face having spring back compensation.

6. The method of claim 5, wherein the global surface morphing process morphs the nominal surface of the original model to compensate for large spring back of the bipolar plate and the local surface morphing process morphs the nominal surface of the original model to compensate for detail features of the bipolar plate.

7. A method for manufacturing a bipolar plate for a fuel cell, the method comprising the steps of: providing an original model of the bipolar plate for a nominal shape of the bipolar plate and a sprung shape of the bipolar plate; generating a projection along a nominal surface of the nominal shape; identifying areas of plastic deformation in the nominal shape, with nodes of the nominal shape adjusted at the areas of plastic deformation to match a geometry of an original CAD surface; employing a projection along a nominal surface of the sprung shape; identifying areas of plastic deformation in the sprung shape, with nodes of the sprung shape adjusted at the areas of plastic deformation to match a geometry of the original CAD surface; performing a compensation process on the original model, the compensation process including a two step morphing process, the two step morphing process providing a compensated model of the bipolar plate; and creating a compensated die face based on the compensated model of the bipolar plate, the bipolar plate manufactured with the compensated die face having spring back compensation.

8. The method of claim 7, wherein the original model of the bipolar plate is a CAD model.

9. The method of claim 7, wherein the two step morphing process includes a global surface morphing process and a local surface morphing process.

10. The method of claim 9, wherein the compensation process includes the steps of:
extracting a model surface from the original model.

11. The method of claim 10, wherein the compensation process includes the steps of:
creating nominal formed part mesh data and sprung mesh data from the model surface.

12. The method of claim 11, wherein the compensation process includes the step of:
employing the nominal formed part mesh data and the sprung mesh data in the two step morphing process.

13. The method of claim 12, wherein the two step morphing process includes the step of:
extracting nominal nodes from the nominal formed part mesh data.

14. The method of claim 13, wherein the two step morphing process includes the step of:
extracting sprung nodes from the sprung mesh data.

15. The method of claim 14, wherein the two step morphing process further includes the step of:
generating vectors to provide compensated nodes from the sprung nodes, the compensated nodes having been adjusted and scaled from the sprung nodes.

16. The method of claim 15, wherein the two step morphing process includes the step of:
employing the nominal nodes and the compensated nodes in the global surface morphing process.

17. The method of claim 16, wherein the global surface morphing process includes the steps of:
calculating a size of the model surface extracted from the original model;
morphing parameters to a global box of the model surface; and
employing the nominal nodes and the compensated nodes to morph over an entire surface geometry of the global box to generate a morphed nominal surface and morphed nominal nodes.

18. The method of claim 17, wherein the local surface morphing process includes the step of:
performing a local morphing preprocessing step employing the morphed nominal surface and the morphed nominal nodes from the global surface morphing process and the compensated nodes.

19. The method of claim 18, wherein the local morphing preprocessing step includes the steps of:
determining definitions for a plurality of local boxes on the morphed nominal surface;
calculating a model size and a layout of the plurality of local boxes on the morphed nominal surface,
determining morph vectors in each of the local boxes,
associating the morph vectors with the morphed nominal nodes of each of the local boxes,
calculating a local box morph batch procedure including local box definitions for each of the local boxes,
morphing nominal nodes for each of the local boxes,
morphing a nominal surface inside each of the local boxes, and
providing a compensated nodes file for each of the local boxes.

20. The method of claim 19, wherein the local surface morphing process further includes the step of:
executing the local surface morphing process using the calculated local box morph batch procedure and the compensated nodes file for each of the local boxes to provide a morphed compensated surface for the compensated model.

* * * * *